April 8, 1969 W. E. HUMPHREY 3,437,397
DOUBLE-MIRROR SYSTEM FOR OPTICAL STABILIZATION
Filed Sept. 14, 1966

INVENTOR
WILLIAM E. HUMPHREY
BY
Lippincott, Ralls & Hendricson
ATTORNEYS

United States Patent Office 3,437,397
Patented Apr. 8, 1969

3,437,397
DOUBLE-MIRROR SYSTEM FOR OPTICAL
STABILIZATION
William E. Humphrey, Berkeley, Calif., assignor to
Optical Research and Development Corporation,
Oakland, Calif., a corporation of California
Filed Sept. 14, 1966, Ser. No. 579,370
Int. Cl. G02b 23/02
U.S. Cl. 350—16                                    5 Claims

ABSTRACT OF THE DISCLOSURE

An optical stabilizer including objective lens for focusing received light, a plane for displaying the received image, and first and second stabilized pairs of mutually perpendicular roof mirrors for intercepting and displacing the focusing light therebetween. Each of the roof mirrors has an apex line and is pivoted about a pivot axis parallel to the apex line and at a distance from the apex substantially equal to one-half the focal length of the lens.

---

Figure 2:
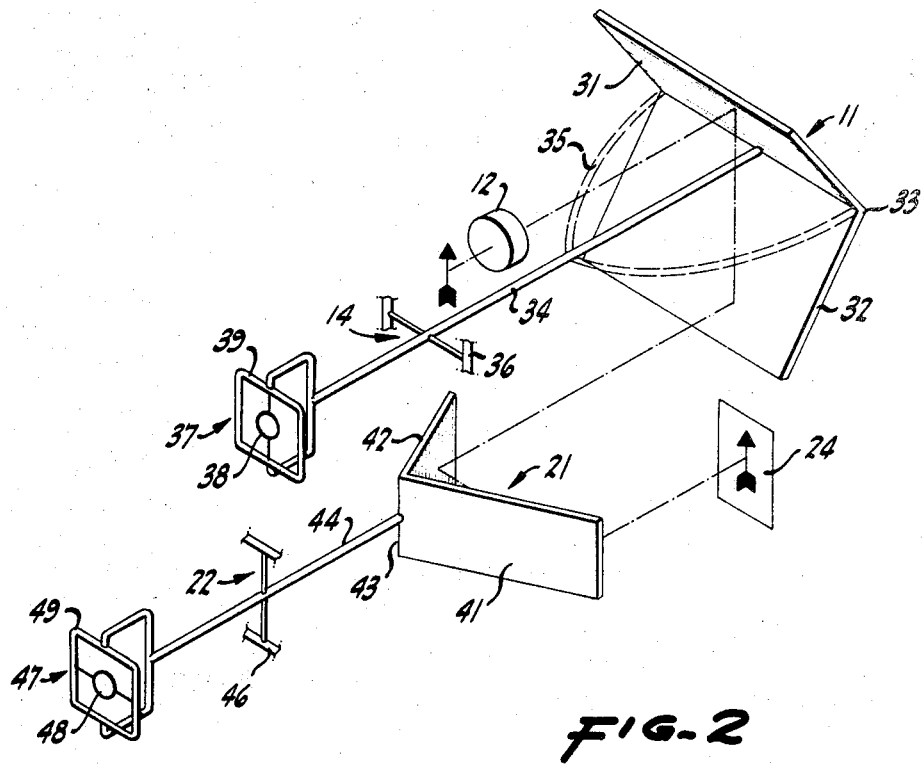

The present invention relates in general to the stabilization of optical systems against small-angle deviations thereof from a desired line-of-sight, and is more particularly directed to accidental-motion compensation that is particularly adapted for use in telescope-like viewing devices. Specifically, the present invention relates a displacement system of the foregoing type employing a pair of double-reflecting elements disposed in 90° relation to each other and both inertially stabilized in space to thereby provide full optical stabilization for light reflected therethrough.

There have been developed a variety of optical compensation methods and apparatus generally directed to the field of levelling instruments and the like. Although certain of these prior art advances have proven highly advantageous, they are primarily limited in application to operation in a single vertical plane. In addition to this general field of endeavor, there have also been developed certain stabilization systems for accidental-motion compensation in all planes for utilization with optical devices in general. There have, for example, been devised refractive systems wherein one portion of a lens system is stabilized in space, so that angular motion of other portions establishes a corrective prism to stabilize an image transmitted therethrough. Additionally, there have been developed electronic or electrical compensation systems which generally, however, require a substantial amount of support equipment so as to have limited applicability. A further general type of accidental-motion compensator is described and claimed in my copending patent application entitled "Optical Stabilization by Reflective Means," filed in the U.S. Patent Office on Aug. 29, 1966, with Ser. No. 575,624. The present invention provides an improvement in this general type of optical stabilization and finds particular utility in viewing devices such as telescopes and binoculars.

The invention described below with respect to a single perferred embodiment thereof employs plane-reflecting surfaces and divides the optical stabilization into two separate stages operating in mutually perpendicular planes. The present invention employs as each reflecting element either a roof mirror, Porro prism or the substantial equivalent thereof. For ease of description, the invention is herein described in connection with roof mirrors; however, it is to be appreciated that a Porro prism is substantially the equivalent thereof and, likewise, that a pair of mirrors disposed in substantially 90° relationship to each other is fully equivalent to a roof mirror. Thus, in the following description, the term "roof mirror" is taken to mean the combination of two mirrors disposed perpendicularly to each other, and having the reflecting surfaces thereof upon the substantially facing sides, as well as prisms and mirror combinations which produce substantially the same results insofar as reflection of light is concerned.

The present invention has certain advantages over alternative reflecting types of accidental-motion compensators. Among these advantages are the absence of linkage or couplings between the two mirror systems of the present invention; the attainment of an upright image of correct parity and moving in the correct direction for viewing by an eyepiece; and the provision of a very compact system. In addition to the foregoing, the present invention, which may utilize gyroscopes for assistance, allows stabilization of single-axis stabilization optics, and provides certain other mechanical variables which are desirable in design of practical systems.

Figure 1:
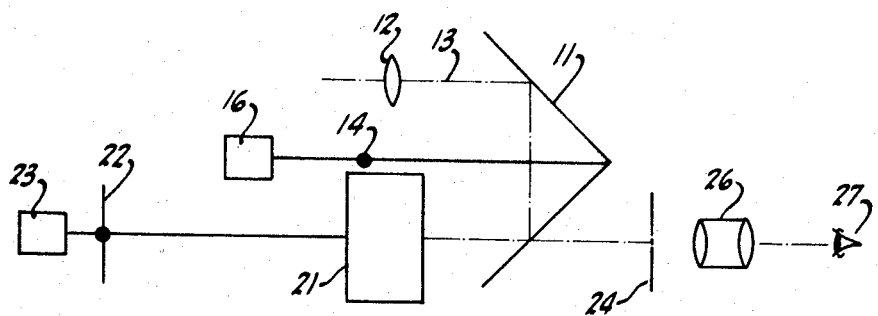

The present invention is illustrated as to a single preferred embodiment thereof in the accompanying drawing wherein:

FIGURE 1 is a line diagram of the invention; and,
FIGURE 2 is a schematic perspective illustration of a preferred embodiment of the invention.

The present invention provides optical stabilization insofar as "pitch" and "yaw" are concerned, but does not provide "roll" stabilization about the optic axis as this is normally not required. Thus, the optical stabilizer hereof compensates for small degrees of motion or vibration perpendicular to the optic axis; and, in the following description the term "stabilization" is to be so understood. Also the terms "angular orientation" and "angular deviation" are herein referenced to the optic axis and not about same.

Considering now the present invention in somewhat greater detail and referring to the drawing, it will be seen that there is illustrated a first compensating roof mirror 11 and an objective lens, or lens system, 12 directing light thereon for reflecting, as indicated by the dashed line 13. The roof mirror 11 is mounted to pivot about a pivot axis 14 normal to the plane of FIGURE 1 with the front face or reflecting surfaces facing pivot axis 14 and is balanced upon this axis by a gyroscope assembly 16, so that the first compensating roof mirror 11 is inertially stabilized with respect to an original optic axis. The stabilization system also includes a second roof mirror 21 disposed in position to intercept light reflected out of the first roof mirror 11 and disposed with the apex line thereof in 90° relation to the apex line of the first roof mirror. In FIGURE 1 this second roof mirror 21 is shown in side view, and is not mechanically coupled to the first roof mirror. The second roof mirror 21 is mounted to pivot about a pivot axis 22 with the rear face or non-reflecting surface facing pivot axis 14 and is inertially stabilized with respect to an original optic axis by a gyroscope assembly 23.

Each of the compensating roof mirrors 11 and 21 is mounted to pivot about a pivot arm that is equal to one-half the focal length of the objective lens 12. It will be seen that light focused on the first compensating mirror from the objective will be reflected from the two mutually perpendicular surfaces of the roof mirror back toward the objective along an optical axis which is parallel to the incoming optical axis in the plane of FIGURE 1. Such reflected light is then intercepted by the second compensating roof mirror 21 which is stabilized in a plane normal to the plane of FIGURE 1, and is, consequently, reflected from the two reflecting surfaces thereof to a stabilized image plane 24. Each of the compensating roof mirrors provides stabilization in a single plane; however, inasmuch as these planes are normal to each other, there is, thus, produced a total compensation, or stabilization, in two mutually perpendicular planes for full stabilization or motion compensation at the stabilized image plane 24. It is to be appreciated that stabilization of an image at an image plane 24 relative to a housing, or the like, is applicable to camera applications wherein a film gate may be located at the image of plane 24. There may also be employed additional optics such as field lens and other lens elements viewing the stabilized image. Optical-viewing devices, however, require alternative stabilization, as briefly identified below. The present invention is generally described with reference to camera applications wherein there is produced an image plane that is stabilized with respect to the housing; however, in all cases the following variation therein is applicable for optical-viewing devices.

It is to be appreciated that the present invention may be advantageously employed in applications such as high-power or variable-power binoculars, for example, in which substantial magnification is incorporated in the overall optical system. Under the circumstances wherein visual viewing of the stabilized image plane is contemplated, the compensation afforded by the present invention is modified from that required for camera applications set forth above. This modification may be expressed in terms of the factor $$\left(1 \pm \frac{1}{M}\right)$$

wherein M is the magnification of the optical system. Reference is made to my above-noted copending patent application for a deviation of this correction factor. Generally, this factor may be written $$\left(1 - \frac{1}{M}\right)$$

the plus sign is used for telescopes giving an inverted image. This above-identified factor may be derived from a complete consideration of optics involved, and may be best incorporated in the present invention by reducing the pivot arm of each roof mirror in proportion thereto. More specifically, the pivot arm or radius for each roof mirror is made equal to $f/2$ $$f/2\left(1 \pm \frac{1}{M}\right)$$

to achieve the appropriate compensation for optical-viewing instruments such as telescopes and binoculars. It is noted that for variable-power binoculars, or the like, provision is made for varying one of the controlling parameters to maintain compensation through a range of magnification. While this may be accomplished by changing the pivot arm length, it is generally preferable to vary the focal length of the objective, either continuously or stepwise. Focal length variations of an objective lens system may be accomplished by changing the separation of lenses therein or switching lens elements as the magnification is varied. Reference is made to my above-noted copending patent application for a further discussion of this modification factor.

Reference is now made specifically to FIGURE 2 of the drawing for further consideration of certain practical aspects of the present invention; and, wherein the same elements as shown in FIGURE 1 are denominated by the same numerals as employed therein. The roof mirror 11 may be formed of two plane mirrors 31 and 32 disposed in substantially mutually perpendicular relationship and having their planes intersecting along a line 33 which may be considered as the apex of the roof mirror 11. A bar, or yoke, 34 is rigidly secured to the mirrors 31 and 32, and in this embodiment is shown in perpendicular relationship to the apex 33 of the roof mirror, or the like. More generally, the yoke need only be secured to the roof mirror and balance same. The yoke need not bisect the angle between the mirrors, for tilting of the mirrors together does not affect image stabilization. In practice this yoke 34 may be split as indicated by the dotted lines 35 in order to preclude interference with the optical path. This yoke 34 is pivotally mounted about an axis 14 parallel to the mirror apex 33, as by means of a gimbal mount 36 secured to a housing which also rigidly mounts the objective 12. This housing is not illustrated in FIGURE 2; however, it is to be appreciated that the present invention is adapted to be contained within some type of light-tight housing, and that the objective 12 is rigidly affixed to such housing for movement therewith. If it be considered that pivot axis 14 is horizontal, it will, thus, follow that the roof mirror 11 is free to pivot in the vertical plane, and such pivoting is herein controlled by a single-degree-of-freedom gyroscope assembly 37. A gyro rotor 38 is mounted on gimbals, so as to have a spin axis perpendicular to the pivot 14. Gimbal-mounting structure 39 is carried by the end of the yoke 34. A variety of means may be employed to rotate the gyro rotor, even including manual rotation thereof should only a limited period of compensation be required. Under the circumstances wherein it is desired to provide for a traverse or panning of an optical device employing the present invention, there may be employed some type of suitable spring attached to the roof mirror or advantage may be taken of the naturally centering force of a flexure bearing, or the like. It is, furthermore, necessary under these circumstances to provide for precession of the gyro by the application of some type of torque thereto, in order to controllably maintain the gyro spin axis parallel to the entering optic axis. Otherwise, the gyroscope will prevent panning of the roof mirror, i.e., it will, through inertial stabilization, maintain the roof mirror fixed in space insofar as one degree of motion thereof is concerned. A single-degree-of-freedom system may be precessed by direct torques on the system, or, it is to be appreciated that a wide variety of method and means is known for applying precessing forces to gyroscopes; and, also, it is well known as to the required vector direction of such forces to achieve desired direction of precessing. As a consequence of the foregoing, it is not believed necessary in the present description to incorporate a dissertation upon gyroscope precessing, other than to particularly note that panning or traverse of the optical instrument containing the present invention, beyod a predetermined few degrees that might occur by accidental motion, requires provision of precessing torquest to the gyroscope, as may be accomplished in known ways.

Further with regard to intentional traverse or panning of the present invention or an optical instrument such as binoculars containing same, it is noted that the application of a restoring or precessing force to the gyroscope tends to convert the gyro into a rate gyro, so as to permit motion of the mirror system. It is noted at this point that a slight coupling exists to rotation about an axis normal to the compensated axis, as a result of the restoring force on the gyro; and this, then, produces a small, false compensation. Minimization of this false compensation can be achieved by use of the smallest practical restoring force on the gyro consistent with a desired maximum panning rate. Alternatively, it is possible to employ other methods of precessing the gyro; and, it is at least theoretically possible to eliminate the false compensation due to cross-coupling of the compensation axes occurring under the circumstances wherein the rate-gyro method is employed. It is also possible to employ torquers operated by a remote gyro and acting on the stabilized system to minimize drift.

The second roof mirror 21, as illustrated in FIGURE 2, will be seen to include a pair of substantially perpendicularly disposed mirrors 41 and 42 secured together and having the planes thereof intersecting along an apex line 43 which is normal to the apex line 33 of roof mirror 11. The second roof mirror 21 is disposed in position to intercept light reflected from the first compensating roof mirror 11, so as to further reflect such light back to the original direction of the light from the objective 12 onto the stabilized image plane 24. The second compensating roof mirror 21 is mounted by a yoke, or bar, 44 secured thereto normal to the apex line 43, and in this instance extending from the rear of the roof mirror. The yoke 44 is substantially frictionlessly mounted on a pivot axis 22 as by means of a gimbal mounting 46 secured to the housing containing the compensation system, so that the roof mirror 21 is free to pivot about an axis parallel to the apex 43 thereof. This mounting yoke 44 also extends beyond the pivot 22 to carry a gyroscope assembly 47 which includes a rotor 48 mounted for rotation about an axis perpendicular to the pivot 22. This rotor may be mounted upon a gimbal assembly carried by a structure 49 secured to the outer end of the yoke 44.

It will be seen that the second compensating roof mirror 21 operates in the same manner as the first compensating roof mirror 11, but in a plane normal thereto and, thus, no detailed description of operation of this second mirror 21 is believed necessary. It is noted that the present invention provides two separate uncoupled compensators operating in mutually perpendicular planes, so as to thereby stabilize an image to the desired extent at the image plane 24. Of course, each of the mirror and gyro assemblies is balanced about the pivot axes thereof, i.e., the roof mirror and lever arm on one side of the pivot balances the gyro and lever arm on the opposite side. Additionally, each of the mirror systems has the moments thereof substantially equal about all axes normal to the pivot axis to avoid the undesired deflections from centrifugal forces resulting from "roll" motions about the axis.

It is to be appreciated that numerous variations and alternatives of the illustrated and described embodiments of the present invention are possible; and, in this connection reference is again made to my above-identified co-pending patent application for an identification of certain of these variations. Certain variations in the present showing are particularly important, however, in connection with telescopes and binoculars; and, thus, for example, suitable additional lenses or alternative types of objective lenses may be employed in order to increase the effective back focal distance of the lenses, or, considered another way, to effectively displace the optical location of the objective to a position behind the first compensating mirror, so that additional optical path length is then provided for the location of the ocular system.

It will be seen that the present invention provides an accidental-motion compensator for producing a stabilized image in a fixed location relative to a housing or case despite small-angle variations in the line-of-sight, as may result from unintentional vibrations or the like with hand-held instruments. The advantages of optical stabilization or accidental-motion compensation are believed self-evident; and the present invention attains these advantages without requiring specially ground lenses or precisely aligned elements as in the prior art, while at the same time utilizing only light reflection and employing the minimum possible number of reflecting surfaces to achieve an image of correct parity moving in the correct direction for viewing by an eye piece, i.e., the same direction as an incoming image. By separating the stabilization into two unconnected portions certain additional advantages are gained in simplicity of construction and ease of assembly. In addition, the number of gimbal axes employed in the system hereof is minimized and the invention provides the possibility of displacing both mirror and gyros along the pivot axes of the systems, so that the gyroscope will not interfer with any light path or other component. It will also be appreciated that the apex of the roof mirrors need not be utilized, and may, in fact, be left out so that only spaced plane mirrors are employed with struts or the like mounting them on the yoke.

Although the present invention has been described above in connection with a single preferred embodiment thereof, it is not intended to limit the invention to the exact terms of the description nor to the precise details of illustration. Reference is made to the accompanying claims for a precise delineation of the true scope of this invention.

What is claimed is:

1. An optical stabilizer comprising: an objective lens system having a predetermined focal length, a plane for displaying an image formed by said objective lens system, means mounting said plane and said objective lens system for common angular movement, a first reflective element disposed in position to intercept light from said objective lens system and including a pair of mutually perpendicular reflecting surfaces having an apex line and having a front facing said objective lens system, means pivotally mounting said first element about a pivot axis at a pivot radius from said apex line in front thereof substantially equal to one-half the focal length of the objective, means intertially stabilizing the angular orientation of said first element about said pivot axis, a second reflective element disposed in position to intercept light reflected from said first element and including a pair of mutually perpendicular reflecting surfaces having an apex line normal to the apex line of said first element and having a rear facing said objective lens system, means pivotally mounting said second element about a second pivot axis to the rear of the element at a distance from said apex line substantially equal to one-half the focal length of said objective, the pivot axes of said elements each being parallel to the respective apex lines thereof, and means inertially stabilizing said second element about said second pivot axis to thereby stabilize the orientation of an image from said objective as reflected from said second element.

2. Apparatus as set forth in claim 1 further defined by the means inertially stabilizing said first and second elements comprising first and second one-degree-of-freedom gyroscopes respectively.

3. Apparatus as set forth in claim 1 further defined by the pivot radius of each of said elements being equal to one-half the focal length of the objective times the factor $$\left(1 \pm \frac{1}{M}\right)$$

wherein M is the magnification of an optical system employed with the present invention, the minus sign is employed with non-inverting image devices and the resultant optical stabilization is particularly adapted for viewing instruments such as telescopes and the like.

4. The apparatus of claim 1 further defined by said first and second elements comprising roof mirrors disposed in mutually perpendicular relationship.

5. The apparatus of claim 1 further defined by a first yoke secured to the first element and extending forwardly therefrom through said first pivot axis and having gimbals on the other end mounting a rotor of a first single-degree-of-freedom gyroscope, and a second yoke secured to said second element and extending rearwardly from the apex line of the second element through said second pivot axis, and second yoke extending through said pivot to gimbals carried on the opposite yoke end and mounting a second single-degree-of-freedom gyroscope whereby said elements in combination inertially stabilize an image against angular deviations from an original line-of-sight.

References Cited

UNITED STATES PATENTS

| | | |
|---|---|---|
| 1,628,777 | 5/1927 | Henderson. |
| 2,571,937 | 10/1951 | Peck. |
| 2,694,869 | 11/1954 | McNatt. |
| 1,639,229 | 8/1927 | Luckey. |
| 2,959,088 | 11/1960 | Rantsch _____ 350—16 X |
| 3,158,674 | 11/1964 | Woodson. |
| 3,298,770 | 1/1967 | Rosendahl _____ 350—36 |

DAVID SCHONBERG, *Primary Examiner.*

P. R. GILLIAM, *Assistant Examiner.*

U.S. Cl. X.R.

88—1